United States Patent
Suzuki et al.

(10) Patent No.: US 6,270,242 B1
(45) Date of Patent: Aug. 7, 2001

(54) VEHICLE LAMP

(75) Inventors: Michihiko Suzuki; Fumihiko Sugiyama; Kazuhiro Yamazaki, all of Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/249,094

(22) Filed: Feb. 12, 1999

(30) Foreign Application Priority Data

Feb. 25, 1998 (JP) .................................................. 10-043092

(51) Int. Cl.[7] ...................................................... B60Q 1/00
(52) U.S. Cl. .......................... 362/546; 362/267; 362/549; 362/310; 362/532; 362/530; 362/531; 362/520; 362/311
(58) Field of Search ..................................... 362/546, 267, 362/549, 310, 532, 530, 531, 520, 311

(56) References Cited

U.S. PATENT DOCUMENTS

| | | | |
|---|---|---|---|
| 5,516,390 | * 5/1996 | Tomita et al. | 362/267 |
| 5,556,584 | 9/1996 | Yamazaki et al. | 264/46.5 |
| 5,560,706 | 10/1996 | Yamazaki et al. | 362/267 |
| 5,626,413 | * 5/1997 | Ferrel | 362/61 |
| 5,909,957 | * 6/1999 | Skirha et al. | 362/546 |
| 5,947,591 | * 9/1999 | Katsumata et al. | 362/267 |
| 5,993,036 | * 11/1999 | Shimada et al. | 362/549 |
| 6,000,814 | * 12/1999 | Nestell et al. | 362/267 |
| 6,059,483 | * 5/2000 | Owens et al. | 403/267 |
| 6,164,807 | * 12/2000 | Gerstner et al. | 362/549 |

* cited by examiner

*Primary Examiner*—Sandra O'Shea
*Assistant Examiner*—Anabel M Ton
(74) *Attorney, Agent, or Firm*—Sughrue, Mion, Zinn, Macpeak & Seas, PLLC

(57) ABSTRACT

A vehicle lamp has a plastic lamp body (10) with a sealing leg (16) that extends from the back of the lamp body and is pressure-welded and held on a vehicle body panel (18), via an elastic sealing material (20). The elastic sealing material is formed by injection-molding of a thermoplastic foamable elastomer where the lamp body (10) is inserted into a mold (40A) and the sealing leg (16) is projected into a sealing-material molding cavity (C1). The sealing material is molded over the whole area of the sealing leg and has a transverse cross section that is U-shaped.

11 Claims, 7 Drawing Sheets

VEHICLE LAMP

BACKGROUND OF THE INVENTION

1. Field of the Invention

The present invention relates to vehicle lamp structures using an elastic sealing material held between a sealing leg and a contacted portion on a peripheral wall in order that the joint between peripheral wall and the contacted portion of the peripheral wall is properly sealed. The vehicle lamp can have an elastic sealing material is held at the joint between the sealing leg of a front lens and the sealing groove of a lamp body. The present invention also includes a vehicle lamp wherein an elastic sealing material is held at the joint between a sealing leg surrounding a bulb replacing opening, in the back of a lamp body, and a vehicle body panel.

2. Description of the Related Art

A vehicle lamp of the sort mentioned above is structured so that, as shown in FIG. 11, the sealing leg 4 of a front lens 3 is mated with a sealing groove 2 formed along the front opening of a lamp body 1 via a elastic sealing material 5, to closely seal the joint between the sealing leg 4 and the sealing groove 2. The sealing material 5 is an elastic material that is prepared by applying to the sealing groove 2 a liquid thermosetting foamable sealing material and heat-drying the material, in order to make the material foam, expand and solidify. Furthermore, the front lens 3 is fixed to the lamp body 1 by mating the sealing leg 4 with the sealing groove 2, so as to mate the sealing leg 4 with the sealing groove 2 by irregular lance-mating (not shown). At this time, the sealing leg 4 and the sealing material 5 are held in such a state that both of them have been pressure-welded together.

On the other hand, a sealing leg 6 is formed on the back wall of the lamp body 1 in such a manner as to surround a bulb fitting hole 1a and a sealing material 8 is held between the sealing leg 6 and a vehicle body panel 7 in order to prevent water and dust from reaching the periphery of the bulb fitting hole 1 a through the gap between the vehicle body panel 7 and the lamp body 1. Reference numeral 9 denotes a light source (bulb) fitted into the bulb fitting hole 1a.

As shown in FIG. 12, the sealing material 8 is molded integrally with the sealing leg 6 by applying the liquid thermosetting foamable sealing material to the groove b of a receiving jig a and making the sealing material foam, swell and harden in such a state that the sealing leg 6 has been fitted into the groove b, so that the sealing material 8 together with the sealing leg 6 can be separated from the receiving jig a. The lamp is fixed to the vehicle body by clamping a bracket on the lamp side and the vehicle body with, for example, bolts and nuts and at this time the bulb fitting hole 1a is so positioned as to align with the bulb replacing opening 7a of the vehicle body panel 7 and hold the sealing leg 6 on the vehicle body panel 7 via the sealing material 8. Nevertheless, the prior art sealing materials 5, 8 are disadvantageous because it takes much time until the materials are dried and solidified (i.e., until their shapes are stabilized) and this results in lowering the lamp productivity to that extent. Since the sealing materials 5, 8 are in a liquid state, the materials are not usable as sealing materials whose shapes varies three-dimensionally.

As the sealing material 8 used for closely sealing the back side of the lamp body 1 is formed through the steps of applying the liquid sealing material to the groove b of the receiving jig a, holding the lamp body 1 while the sealing leg 6 is kept in engagement with the groove b and then removing the receiving jig a, the number of working steps for integrating the sealing material 8 with the sealing leg 6 becomes large and the problem is that it is troublesome work to follow the steps.

SUMMARY OF THE INVENTION

An object of the present invention made in consideration of the foregoing problems pertaining to the prior art is to provide a vehicle lamp with an excellent productivity by incorporating an elastic sealing material made of thermoplastic foamable elastomer with the leading end portion or the contacted portion of a peripheral wall in a short time by injection molding. Another object of the present invention is to provide a vehicle lamp wherein an elastic sealing material is incorporated with the leading end portion of a peripheral wall through a smaller number of working steps.

In order to accomplish the above object, a vehicle lamp according to the present invention is constructed wherein the leading end portion of a peripheral wall extended to the back of a plastic lamp component member is pressure-welded and held in a contacted portion on the peripheral wall via an elastic sealing material, and the elastic sealing material is formed of thermoplastic foamable elastomer molded integrally onto the leading end portion of the peripheral wall or the contacted portion of the peripheral wall by injection-molding with the lamp component member or the contacted portion of the peripheral wall inserted into a mold.

When the molten thermoplastic foamable elastomer is injected into the cavity of the mold in an injection-molding machine body at high temperature and high pressure, water, as liquid dispersed in the foamable elastomer, becomes gasified and foamed and the cavity is filled with the elastomer. The elastomer is then solidified and integrally molded in the leading end portion of the peripheral wall or the contacted portion thereof.

According to another aspect of the present invention, a vehicle lamp wherein a sealing leg as a peripheral wall formed on the back of a front lens as a plastic lamp component member is pressure-welded and held via an elastic sealing material onto a sealing groove as the contacted portion of the peripheral wall formed along the peripheral edge of the front opening of a plastic lamp body, is such that the elastic sealing material is formed of thermoplastic foamable elastomer molded integrally onto the leading end portion of the sealing leg or in the sealing groove by injection-molding in such a manner as to project the sealing leg into a sealing-material molding cavity after the front lens is inserted into a mold or to use the sealing groove as the sealing-material molding cavity after the lamp body is inserted in the mold.

The foamable elastomer thus injected into the cavity in which the sealing leg is projected becomes foamed and solidified around the sealing leg and is integrally molded onto the sealing leg.

The foamable elastomer injected into the sealing groove forming the sealing material molding cavity becomes foamed and solidified in the sealing groove and is integrally molded in the sealing groove.

According to another aspect of the present invention, a vehicle lamp wherein a sealing leg as a peripheral wall formed so as to surround a bulb fitting hole in the back wall of a lamp body as a plastic lamp component member is pressure-welded and held onto a vehicle body panel as the contacted portion of the peripheral wall via an elastic sealing material, is such that the elastic sealing material is formed of thermoplastic foamable elastomer molded integrally onto the leading end portion of the sealing leg by injection-molding in such a manner as to project the sealing leg into a sealing-material molding cavity after the lamp body is inserted into a mold.

The foamable elastomer thus injected into the cavity in which the sealing leg is projected becomes foamed and solidified around the sealing leg and is integrally molded onto the sealing leg.

According to another aspect of this invention, the vehicle lamp is such that sealing-material molding faces extending and crossing the peripheral wall at substantially right angles are each formed on the inside and outside of the root portion of the peripheral wall and wherein the elastic sealing material which is U-shaped in transverse cross section is integrally stuck to the whole area of the surface of the peripheral wall from the sealing material molding faces.

The elastic sealing material (foamable elastomer) is U-shaped in transverse cross section for embracing the whole root portion from the leading end portion of the sealing leg as the peripheral wall and consequently the molded elastic sealing material (foamed elastomer) is prevented from producing an undercut portion.

According to another aspect of this invention, the vehicle lamp is such that a plurality of gates facing the sealing-material molding cavity in the mold are provided at substantially equal intervals in the direction in which the cavity is extended.

As the foamable elastomer is injected from the plurality of gates set at substantially equal intervals in the direction of extending the cavity, the cavity can be filled up with the foamable elastomer uniformly in a short time.

According to another aspect of this invention, the vehicle lamp is such that the step of injection-molding the elastic sealing material is followed after the step of injection-molding the lamp component member is taken.

The steps of injection-molding the lamp component member up to injection-molding the elastic sealing material can be followed in a series of molding steps.

According to another aspect of this invention, the vehicle lamp is such that the step of injection-molding the elastic sealing material is followed after replacing part of the whole of the mold for molding the lamp component member upon the termination of injection-molding of the lamp component member.

With the use of part of the mold for injection-molding the lamp component member, the elastic sealing material can be molded without taking the molded lamp component member out of the mold.

DESCRIPTION OF THE PREFERRED EMBODIMENTS

A mode for carrying out the invention will subsequently be described with reference to embodiments thereof.

Figure 1:
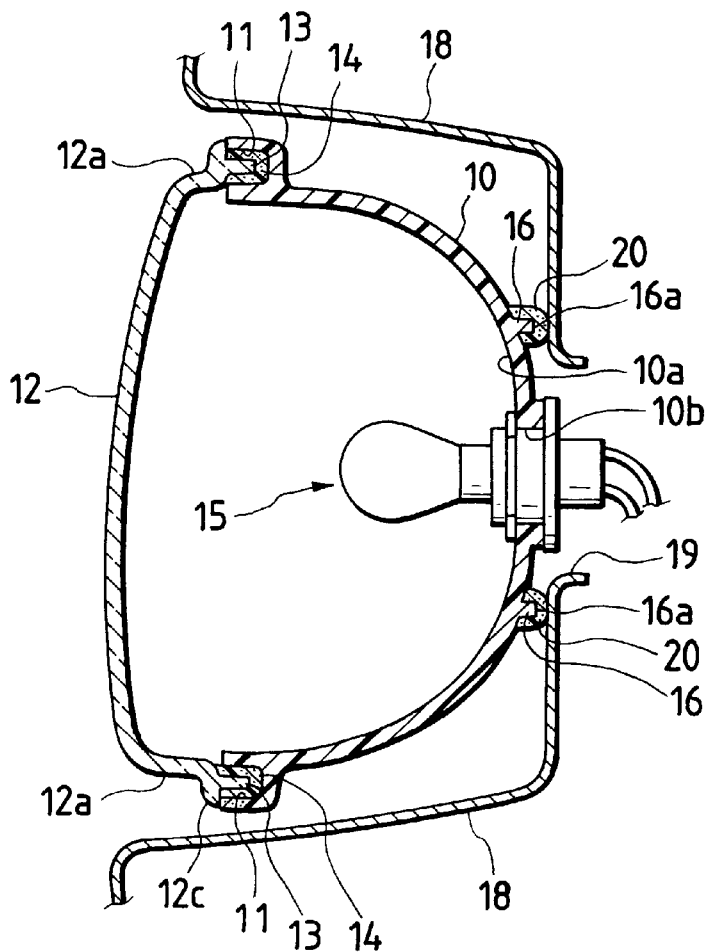
FIG. 1 is a vertical sectional view of the clearance lamp as a first embodiment of the invention.
Figure 2:
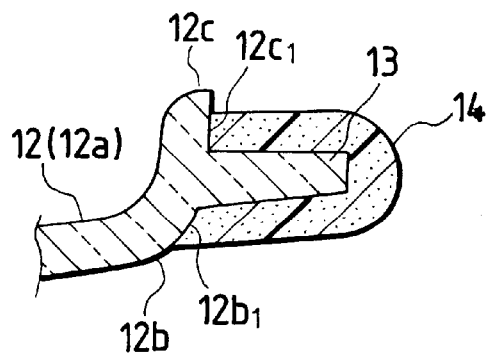
FIG. 2 is An enlarged sectional view of a portion close to the sealing leg of a front lens.
Figure 3:
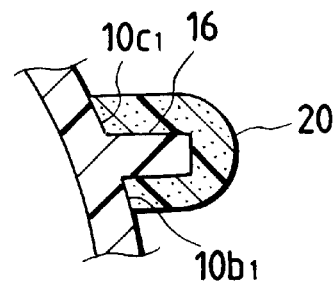
FIG. 3 is an enlarged sectional view of a portion close to a sealing leg formed on a lamp body
Figure 4:
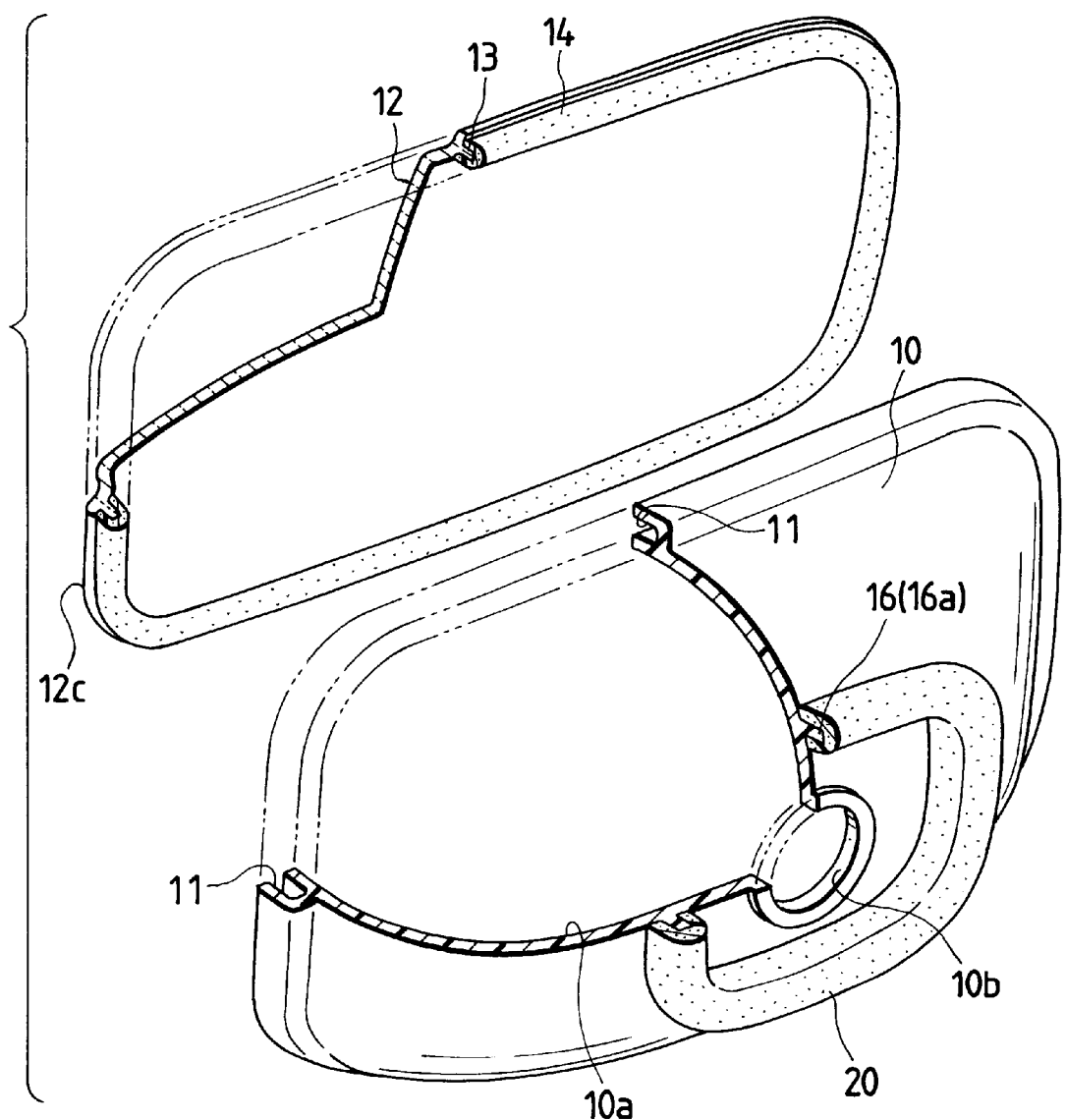
FIG. 4 is an exploded perspective view of the partially-cutaway front lens and the lamp body.
Figure 5:
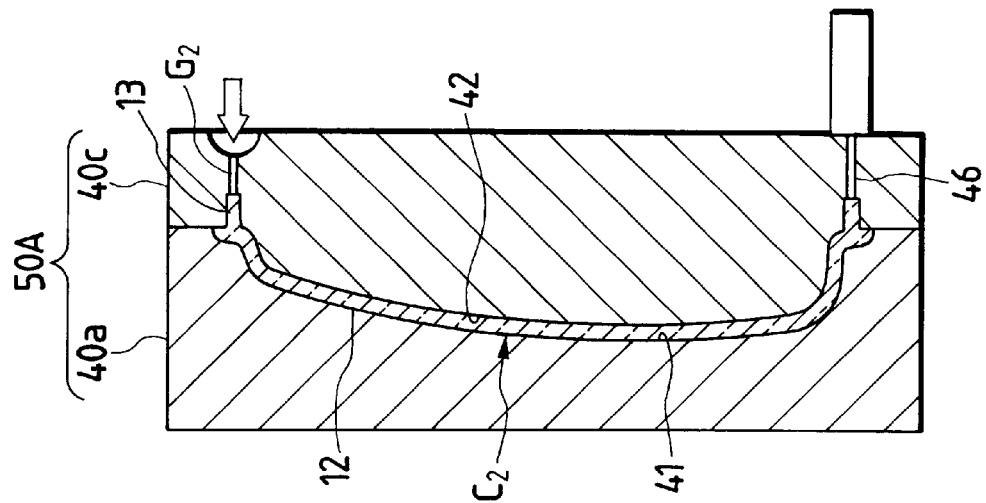
FIG. 5 is a sectional view showing the step of injection-molding an elastic sealing material onto the sealing leg of the front lens.
Figure 6:
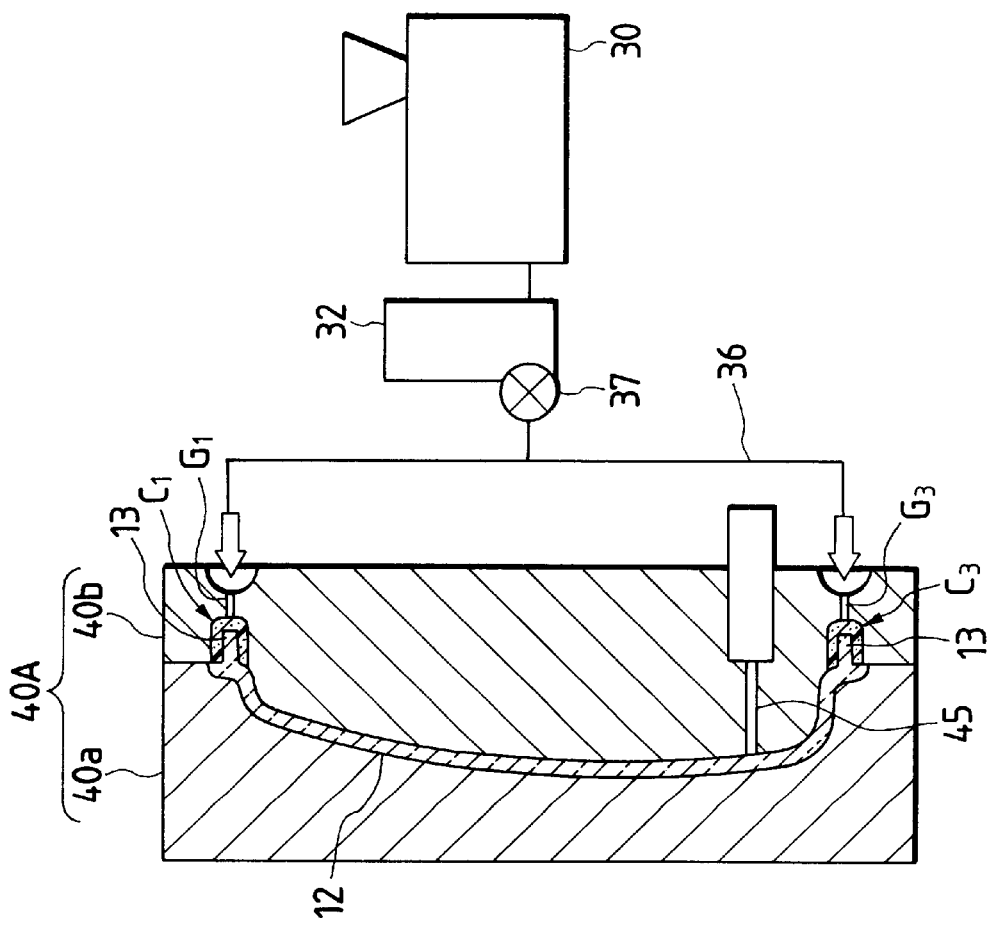
FIG. 6 is a sectional view showing the step of injection-molding the front lens.
Figure 7:
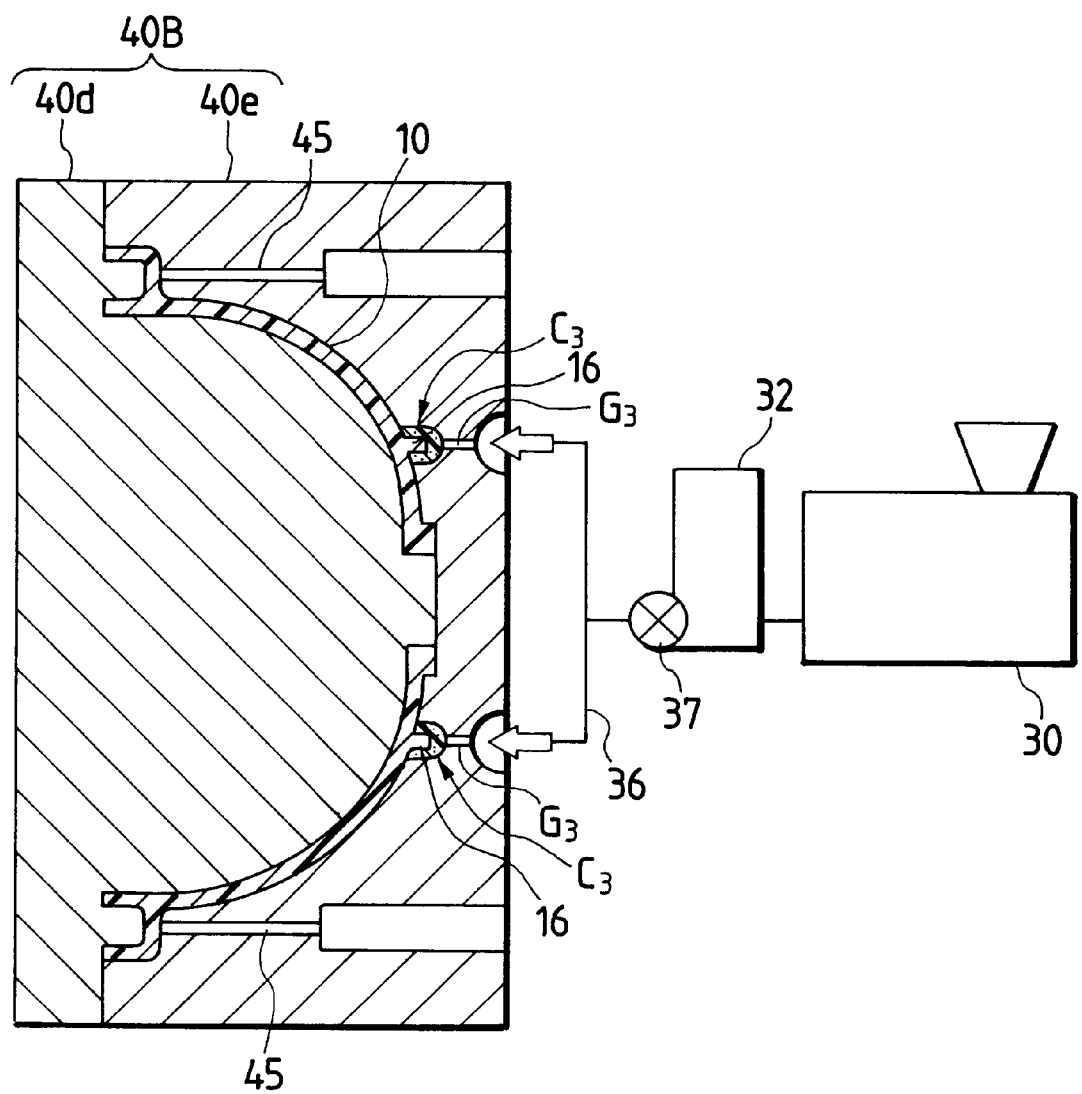
FIG. 7 is a sectional view showing the step of injection-molding an elastic sealing material onto the sealing leg of the lamp body.
Figure 8:
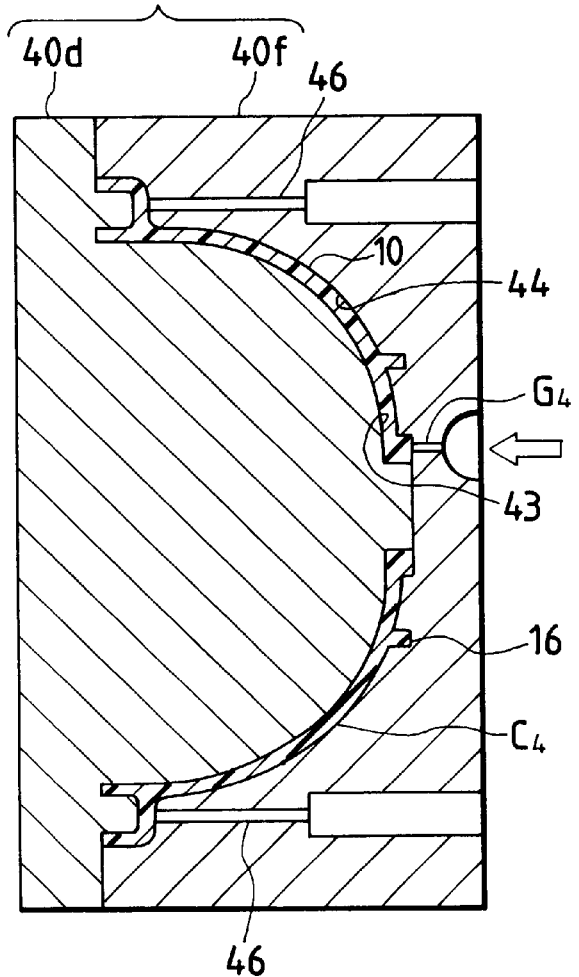
FIG. 8 is a sectional view showing the step of injection-molding the lamp body.

FIGS. 1–8 show a clearance lamp as a first embodiment of the invention, wherein FIG. 1 is a vertical sectional view of the clearance lamp; FIG. 2, an enlarged sectional view of a portion close to the sealing leg of a front lens; FIG. 3, an enlarged sectional view of a portion close to a sealing leg formed on a lamp body; FIG. 4, an exploded perspective view of the partially-cutaway front lens and the lamp body; FIG. 5, a sectional view showing the step of injection-molding an elastic sealing material onto the sealing leg of the front lens; FIG. 6, a sectional view showing the step of injection-molding the front lens; FIG. 7, a sectional view showing the step of injection-molding an elastic sealing material onto the sealing leg of the lamp body: FIG. 8, a sectional view showing the step of injection-molding the lamp body.

In these drawings, reference numeral 10 denotes the container-like lamp body of the clearance lamp, the lamp body 10 being made of synthetic resin such as ABS, AAS, BMC, PP or the like. A parabolic reflector 10a is formed integrally on the inner peripheral face of the lamp body 10. Reference numeral 10b denotes a bulb fitting hole formed in the rear top portion of the lamp body 10, a bulb being fitted into the bulb fitting hole 10b; and 12, a transparent front lens made of synthetic resin such as PMMA, PC or the like and fitted into the front opening of the lamp body 10.

A sealing groove 11 is circumferentially formed in the front opening of the lamp body 10, whereas a sealing leg 13 extending backward and mating with the sealing groove 11 is circumferentially formed in the peripheral edge portion of the front lens 12. A sealing material 14 is supplied to the joint between the sealing leg 13 and the sealing groove 11 so as to closely seal the joint between the front lens 12 and the lamp body 10 (the joint between the sealing leg 13 and the lamp body 10).

More specifically, an irregular lance-mating portion having a mating projection (not shown) formed on the side of the sealing leg 13 and a mating hole (not shown) provided in the outer sidewall of the sealing groove 11 is provided between the sealing leg 13 and the sealing groove 11. When the sealing leg 13 is inserted into the sealing groove 11, the projection on the side of the sealing leg 13 is fixedly mated with the mating hole on the side of the sealing groove 11 (irregular lance-mating) in order to prevent the sealing leg 13 from slipping off the sealing groove 11a nd the joint between the sealing leg 13 and the sealing groove 11 is held and closely sealed in such a state that the sealing leg 13 has been pressure-welded to the sealing groove 11 by the sealing material 14.

As shown in FIG. 2, a stepped portion 12b is formed on the inside between the sidewall 12a of the front lens 12 and the sealing leg 13 and simultaneously a flange portion 12c is formed on the outside of the root portion of the sealing leg 13, so that sealing material molding faces 12b 1, 12c 1 crossing the sealing leg 13 at substantially right angles are each formed on the inside and outside of the root portion of the sealing leg 13. The U-shaped sealing material 14 in transverse cross section is integrally stuck to the whole area of the outer face of the sealing leg 13 from the sealing material molding faces 12b 1, 12c 1.

Reference numeral 16 denotes a sealing leg extending backward from the back wall of the lamp body 10 in such a manner as to surround the bulb fitting hole 10b, an elastic sealing material 20 being held between the sealing leg 16 and a vehicle body panel 18.

A bracket (not shown) extendedly formed on the lamp body 10 in the lamp is fixed to the vehicle body panel 18 with bolts and nuts (not shown). When the lamp is fitted and fixed to the vehicle body panel 18, moreover, the bulb fitting hole 10b of the lamp body 10 is positionally aligned with the bulb replacing opening 19 of the vehicle body panel 18 and the joint between the sealing leg 16 and the vehicle body panel 18 is held and closely sealed in such a state that the sealing material 20 has been pressure-welded between the sealing leg 16 and the vehicle body panel 18.

As shown in FIG. 3, sealing material molding faces 10b1, 10c1 crossing the sealing leg 16 at substantially right angles are each formed on the inside and outside of the root portion of the sealing leg 16 on the back of the lamp body 10. The U-shaped sealing material 20 in transverse cross section is integrally stuck to the whole area of the outer face of the sealing leg 16 from the sealing material molding faces 10b 1, 10c1.

Furthermore, a sealing-material injection molding apparatus shown in FIG. 5 or FIG. 7 is used for molding the sealing material 14 or 20 by incorporating the thermoplastic foamable elastomer onto the sealing leg 13 or 16.

More specifically, the sealing-material injection molding apparatus essentially consists of a mold 40A or 40B containing the front lens 12 or lamp body 10 as an insert and having a sealing-material molding cavity C1 or C2 formed in such a position as to surround the sealing leg 13 or 16 of the front lens 12 or lamp body 10, an extruder 30 which is fixedly installed on the floor, for example, and used for melting and extruding a sealing material (e.g., olefin elastomer), an accumulator 32 for storing the molten sealing material extruded from the extruder 30 in an unfoamed state, a valve 37 installed midway and a sealing-material supply passage 36 for guiding the molten sealing material in the accumulator 32 to the mold 40A or 40B.

The mold 40A or 40B essentially consists of a left-hand movable half 40a or 40d and a right-hand front mold 40b or 40e, and the front lens 12 or lamp body 10 is inserted in between both of them 40a, 40b or 40d, 40e. The sealing leg 13 or 16 in a projected state is held in the sealing-material molding cavity C1 or C2 and the molten sealing material or foamable elastomer is injected into the cavity C1 or C2 from a gate G1 or G2. Reference numeral 45 denotes an ejection pin.

Water liquified because of high temperature and high pressure is dispersed in the molten unfoamed elastomer within the accumulator 32 and when the molten unfoamed elastomer is injected into the cavity C1 or C2 where the pressure is lower than the pressure in the accumulator 32 at high speed, the water contained in the unfoamed elastomer becomes gasified and foamed and is filled in the cavity C1 or C2 before being solidified within several seconds. The molding operation is thus terminated.

As the gate G1 or G2 is provided in a plurality of places at equal intervals in the direction in which the cavity C1 or C2 is extended in particular, the cavity C1 or C2 is uniformly filled with the foamable elastomer in a short time and the foaming condition of the elastomer becomes uniformized along the direction in which the cavity C1 or C2 is extended accordingly. Therefore, the molded sealing material 14 or 20 is continuous uniformly in size along the sealing leg 13 or 16. The sealing performance is made uniform along the sealing leg 13 or 16, whereby to ensure that the joint between the sealing groove 11a nd the sealing leg 13 or between the sealing leg 16 and the vehicle body panel 18 is sealed.

As the sealing material 14 or 20, the use of an injection-molded product of olefin, styrene or urethane thermoplastic foamable elastomer is considered and because the sealing material 14 or 20 is incorporated with the sealing leg 13 or 16 in such a manner as to embrace the sealing leg or 16, the sealing material 14 does not simply slip off the sealing leg 13 or 16 and consequently this facilitates the work of integrating the front lens 12 into the lamp body 10 and fitting the lamp to the vehicle body.

FIG. 6 or 8 shows the steps of injection-molding the front lens 12 or lamp body 10 by means of a mold 50A or 50B composed of the left-hand movable half 40a or 40d and the right-hand front mold 40c or 40e. The mold 40a or 40d is employed as the movable half of the mold 40A or 40B for injection-molding the sealing material 14 and in the movable half 40a or 40d, a molding face 41 or 43 for molding the front side of the front lens 12 or lamp body 10 is formed, whereas in the front mold 40, a molding face 42 or 44 for molding the rear side of the front lens 12 or lamp body 10 is formed. Then the molten resin is injected from a gate G2 or G4 into a cavity C2 or C4 partitioned with the molding faces 41, 42 or 43, 44. Reference numeral 46 denotes an ejection pin.

A description will subsequently be given of the steps of injection-molding the elastic sealing material 14 or 20 onto the sealing leg 13 or 16 after the molding of the front lens 12 or lamp body 10 is carried out.

The mold 50A or 50B is used for injection-molding the front lens 12 or lamp body 10 and then the movable half 40a or 40d is separated from the front mold 40c or 40f. At this time, the operation of the ejection pin 46 is interlocked with the movable half 40a or 40d so as to separate the front lens 12 or lamp body 10 as a molded piece from the front mold 40c or 40f while the front lens 12 is made to adhere to the movable half 40a or 40d.

Subsequently, the movable half 40a or 40d of the mold 50A or 50B is moved up to a predetermined position forwardly opposite to the front mold 40b or 40e of the sealing-material injection molding apparatus and stuck to the front mold 40b or 40e before the mold 40A or 40B is closed. Then the valve 37 is opened so as to inject the molten sealing material or unfoamed elastomer via the supply passage 36 and the gate G1 or G3 into the cavity C1 or C3. The cavity C1 or C3 is filled with the sealing material within several seconds and the molding operation is terminated when the sealing material is solidified. The movable half 40a or 40d is separated from the front mold 40b or 40e and the molded piece and furthermore the ejection pin 45 is caused to operate to separate the front lens 12 or lamp body 10 from the movable half 40a or 40d.

Since the sealing material 14 or 20 is thus molded after the front lens 12 or lamp body 10 is molded according to the aforesaid embodiment of the invention, the production efficiency of the front lens 12 and the lamp body 10 is improved.

Furthermore, part 40a or 40d of the mold 50A or 50B for the front lens 12 or lamp body 10 is used as part of the mold 40A or 40B for molding the sealing material and the sealing-material injection-molding step is followed without taking the molded front lens 12 or lamp body 10 away from the movable half 40a or 40d, whereby the interval between the step of molding the front lens 12 or lamp body 10 and that of molding the sealing material 14 or 20 is shortened.

Particularly when the sealing material 20 is formed of the olefin foamable elastomer with respect to the lamp body 10 made of PP, though the molded elastic sealing material 20 is kept integrally adhering to the sealing leg 16 as aforesaid, the following advantages are attainable as the lamp body 10 and the sealing material 20 are commonly made of olefin.

Firstly, the lamp body 10 and the sealing material 20 can be recycled without being subjected to segregated disposal.

Secondary, the sealing material 20 is not easily slipped off the sealing leg 16 because the adhesion of the molded sealing material 20 to the sealing leg 16 of PP is strong and this makes it easy to store and supervise the lamps and to fit the lamp fixedly to the vehicle body panel 18.

Although part (movable half) 40a of the mold 50A (40a, 40c) for injection-molding the front lens and part (movable half) 40d of the mold 50B (40d, 40f) for injection-molding the lamp body are utilized as part (movable half) of the molds 40A, 40B for molding the sealing material, the sealing material may be injection-molded by using the molds 40A, 40B for injection-molding the sealing material as the bodies separated from the mold 50A for injection-molding the front lens and the mold 50B for injection-molding the lamp body.

Figure 9:
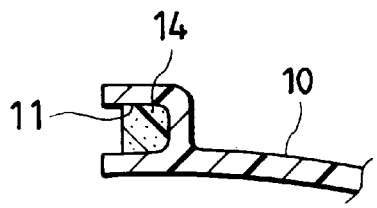
FIG. 9 is an enlarged vertical sectional view of an essential portion surrounding a sealing groove in another embodiment of the invention.
Figure 10:
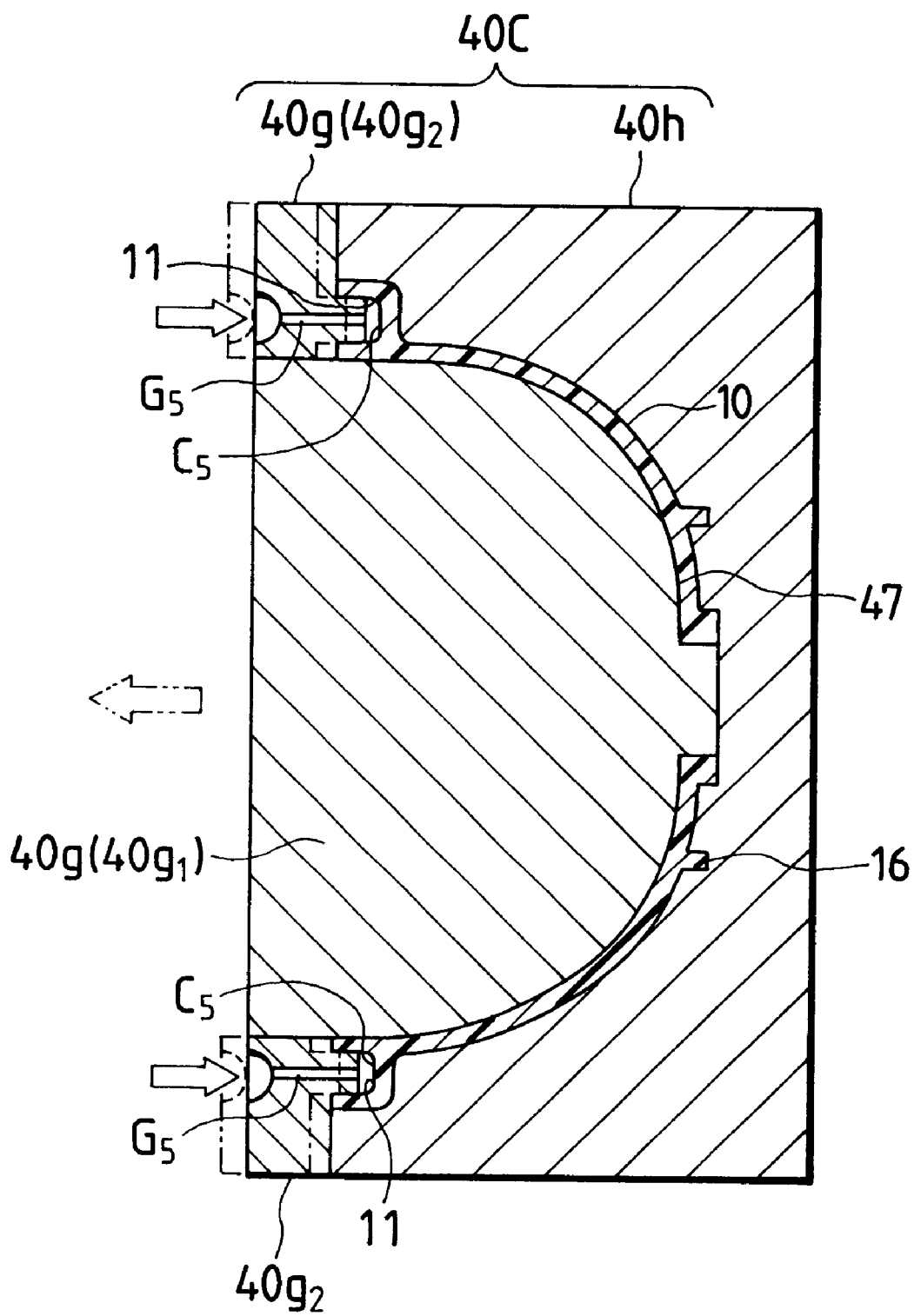
FIG. 10 is a sectional view showing the steps of injection-molding an elastic sealing material in the sealing groove of the lamp body.
Figure 11:
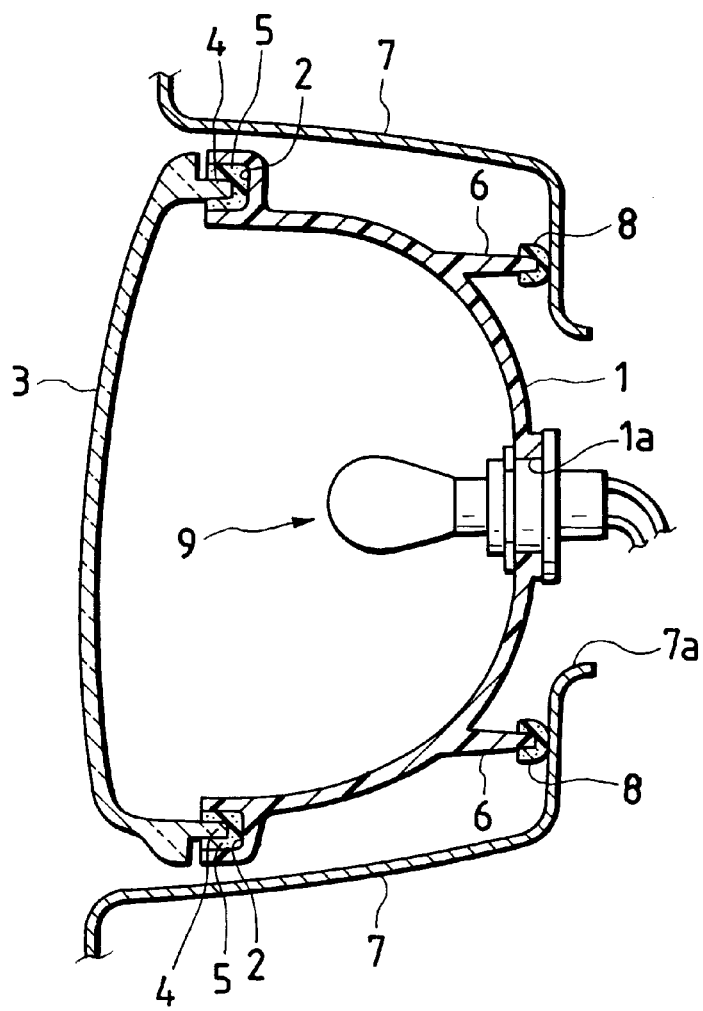
FIG. 11 is a sectional view of a conventional vehicle lamp.
Figure 12:
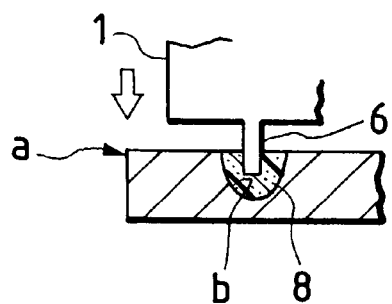
FIG. 12 is a sectional view showing the steps of molding an elastic sealing material onto the leading end of a sealing leg.

FIGS. 9 and 10 show another embodiment of the present invention, wherein FIG. 9 is an enlarged vertical sectional view of an essential portion surrounding a sealing groove; and FIG. 10, a sectional view showing the steps of injection-molding an elastic sealing material in the sealing groove.

As shown in FIG. 9, the sealing groove 11 of the lamp body 10 is filled with the sealing material 14 formed of an injection molded material of thermoplastic foamable elastomer. An injection-molding mold 40C shown in FIG. 10 is used for molding the sealing material 14 in the sealing groove 11. The mold 40C essentially consists of a front mold 40g and a movable half 40h, and the lamp body 10 is inserted into the mold 40C (between the front mold 40g and the movable half 40h), a cavity C5 for molding the sealing material being formed by the sealing groove 11.

The front mold 40g further consists of a fixed central portion 40g 1 with a face 47 kept in intimate contact with the inside of the lamp body 10, a gate G5 communicating with a cavity C5 and a movable peripheral portion 40g 2 fitted to the outer periphery of the fixed central portion 40g 1. A molten sealing material or unfoamed elastomer is injected into the cavity C5 from the gate G5 at high pressure so as to fill the cavity C5 with the foamable elastomer rapidly and the movable peripheral portion 40g 2 is moved back (in the left direction of FIG. 10) up to the position shown by an imaginary line of FIG. 10, whereby to increase a foaming magnification by widening the volume of the cavity C5.

When the sealing material 14 is formed of the olefin foamable elastomer with respect to the lamp body 10 of PP, the adhesion of the sealing material 14 to the sealing groove 11 is increased and excellent sealing property is provided at the joint between the sealing groove 11 and the sealing leg 13, so that the sealing material 14 and the lamp body can be recycled without being especially subjected to segregated disposal.

As set forth above, since the elastic sealing material made of the thermoplastic foamable elastomer can be integrally and simply molded into the predetermined configuration in a short time in the leading end portion of the peripheral wall or the contacted portion of the peripheral wall through the injection-molding by inserting the lamp component member or the contacted portion of the peripheral wall into the mold according to the vehicle lamp of this present invention, the lamp productivity is improved and it is also ensured that the joint between a peripheral wall varying three-dimensionally and the contacted portion of the peripheral wall is sealed up.

According to another embodiment of the present invention, since the elastic sealing material can be integrally and simply molded into the predetermined configuration in a short time in the leading end portion of the sealing leg of the front lens or the sealing groove of the lamp body, the work of incorporating the front lens with the lamp body is simplified and the lamp productivity is greatly improved.

Moreover, the present invention can be applied to a sealing leg or sealing groove varying three-dimensionally that has heretofore been considered difficult to apply.

The foamable elastomer or elastic sealing material integrally molded on the sealing leg of the front lens or the foamable elastomer or elastic sealing material integrally molded in the sealing groove of the lamp body is uniformly formed in cross section along the sealing leg or the sealing groove to ensure that the joint between the sealing leg and the sealing groove is sealed up.

According to another embodiment of the present invention, since the elastic sealing material can be integrally and simply molded into the predetermined configuration in a short time in the leading end portion of the sealing leg of the lamp body, the work of mounting the lamp on the vehicle body is simplified.

The foamable elastomer or elastic sealing material integrally molded on the sealing leg of the lamp body is uniformly formed in cross section along the sealing leg to ensure that the pressure-welding portion between the sealing leg and the vehicle body panel is sealed up.

According to another embodiment of the present invention, since the foamable elastomer is molded over the whole area from the leading end portion of the sealing leg as the peripheral wall up to the root portion thereof when the foamable elastomer is injection molded on the sealing leg as the peripheral wall, no undercut portion is formed in the elastic sealing material and the mold structure is provided simply and precisely to that extent.

According to another embodiment of the present invention, since the whole cavity is uniformly filled with the foamable elastomer in a short time, the time required to mold the elastic sealing material becomes reducible and the sealing performance in the longitudinal direction of the sealing material is kept constant with the effect of improving the sealing performance in the sealing portion.

According to another embodiment of the present invention, since the steps of injection-molding the lamp component member up to injection-molding the elastic sealing material can be followed in a series of molding steps without following any additional step of integrating the elastic sealing material with the lamp component member, the production efficiency of the lamp incorporating the elastic sealing material is greatly improved.

According to another embodiment of the present invention, since part of the mold used for injection-molding the lamp component member is commonly used for injection-molding the elastic sealing material, the production efficiency of the lamp incorporating the elastic sealing material is greatly improved.

What is claimed is:

1. A vehicle lamp, comprising:

plastic lamp component members;

a peripheral wall integrally formed on at least one of said plastic lamp component members; and an elastic sealing material comprising a thermoplastic foamable elastomer, said material being molded integrally onto a leading end portion of the peripheral wall or onto a contacted portion of another one of the plastic lamp component members that is contacted by the leading end portion of the peripheral wall, by injection-molding by inserting the at least one of said plastic lamp component members or the another one of the plastic lamp component members into a mold, whereby the leading end portion of the peripheral wall is pressure-welded and held at the contacted portion via said elastic sealing material.

2. The vehicle lamp according to claim 1, wherein the plastic lamp component members include a front lens and a lamp body.

3. The vehicle lamp according to claim 2, further comprising:

a sealing leg as the peripheral wall integrally formed with the front lens, which is extended in a back side of the front lens; and the elastic sealing material comprising the thermoplastic foamable elastomer, being molded integrally onto the sealing leg, by injection-molding by inserting the front lens into the mold and projecting the sealing leg into a sealing-material molding cavity, whereby the sealing leg is pressure-welded and held at a sealing groove formed along a peripheral edge of a front opening of the lamp body via said elastic sealing material.

4. The vehicle lamp according to claim 2, further comprising:

a sealing leg as the peripheral wall integrally formed with the front lens, which is extended in a back side of the front lens; and the elastic sealing material comprising the thermoplastic foamable elastomer, being molded integrally onto a sealing groove formed along a peripheral edge of a front opening of a lamp body, by injection-molding by inserting the lamp body into the mold and using the sealing groove as a sealing-material molding cavity, whereby the sealing leg is pressure-welded and held at the sealing groove via said elastic sealing material.

5. The vehicle lamp according to claim 3, wherein sealing-material molding faces extended from the peripheral wall, being substantially perpendicular with the peripheral wall, are formed, respectively, on an inside and an outside of a root portion of the peripheral wall and the elastic sealing material is formed with a U-shaped transverse cross section, which is integrally adhered to a whole area of the surface of the peripheral wall from said sealing-material molding faces.

6. The vehicle lamp according to claim 1, further comprising:

said plastic lamp component members including a front lens and a lamp body;

a sealing leg as the peripheral wall integrally formed with a back wall of the lamp body, which surrounds a bulb fitting hole; and the elastic sealing material comprising the thermoplastic foamable elastomer, being molded integrally onto the sealing leg, by injection-molding by inserting the lamp body into the mold and projecting the sealing leg into a sealing-material molding cavity, whereby the sealing leg is pressure-welded and held at a vehicle body panel via said elastic sealing material.

7. The vehicle lamp according to claim 6, wherein a sealing-material molding face extended from the peripheral wall, being substantially perpendicular with each other, is formed on an inside and an outside of a root portion of the peripheral wall and the elastic sealing material is formed with a U-shaped transverse cross section, which is integrally adhered to a whole area of the surface of the peripheral wall from said sealing-material molding faces.

8. The vehicle lamp according to claim 1, wherein a plurality of gates facing a sealing-material molding cavity in the mold are provided at substantially equal intervals in a direction in which the cavity is extended.

9. The vehicle lamp according to claim 1, wherein the step of injection-molding the elastic sealing material occurs after a step of injection-molding to form the lamp component members.

10. The vehicle lamp according to claim 9, wherein the step of injection-molding of the elastic sealing material is performed by replacing a part of the mold used for injection-molding of the lamp component members.

11. The vehicle lamp according to claim 9, wherein a different mold is used for the injection-molding of the lamp component members than the mold used in the step of injection-molding the elastic sealing material.

* * * * *